US012239150B2

(12) United States Patent
Kaiser (10) Patent No.: US 12,239,150 B2
(45) Date of Patent: Mar. 4, 2025

(54) SYSTEMS AND DEVICES AND METHODS OF MAKING AND USING THE SAME TO PREPARE NUT MILK PRODUCTS

(71) Applicant: Elemental Device Design, LLC, Fort Wayne, IN (US)

(72) Inventor: Adam Kaiser, Fort Wayne, IN (US)

(73) Assignee: Elemental Device Design, LLC, Fort Wayne, IN (US)

( * ) Notice: Subject to any disclaimer, the term of this patent is extended or adjusted under 35 U.S.C. 154(b) by 905 days.

(21) Appl. No.: 16/612,292

(22) PCT Filed: May 8, 2018

(86) PCT No.: PCT/US2018/031648
§ 371 (c)(1),
(2) Date: Nov. 8, 2019

(87) PCT Pub. No.: WO2018/208816
PCT Pub. Date: Nov. 15, 2018

(65) Prior Publication Data
US 2020/0100516 A1    Apr. 2, 2020

Related U.S. Application Data

(60) Provisional application No. 62/503,176, filed on May 8, 2017.

(51) Int. Cl.
*A47J 43/27*    (2006.01)
*A23L 2/38*    (2021.01)
(Continued)

(52) U.S. Cl.
CPC ............. *A23L 25/30* (2016.08); *A23L 2/38* (2013.01); *A23L 2/66* (2013.01); *A23N 1/02* (2013.01); *A47J 43/27* (2013.01); *A47J 44/00* (2013.01)

(58) Field of Classification Search
CPC .. A47J 44/00; A47J 19/02; A47J 19/06; A47J 19/027; A47J 37/0835; A47J 43/0716;
(Continued)

(56) References Cited

U.S. PATENT DOCUMENTS 3,759,416 A  *  9/1973  Constantine ....... B65D 21/0219
                                                    206/508
5,482,727 A     1/1996  LaBorde et al.
(Continued)

FOREIGN PATENT DOCUMENTS

CA      2884773 A1  *  3/2014  ....... A61F 13/00068
CN    101531265 A   *  9/2009  ......... B65D 33/2541
(Continued)

OTHER PUBLICATIONS

Nutribullet ("Nutribullet Almond Milk", Apr. 1, 2015, https://web.archive.org/web/20150403015306/https://allnutribulletrecipes.com/nutribullet-almond-milk/, downloaded Oct. 27, 2021). (Year: 2015).*
(Continued)

*Primary Examiner* — Reginald Alexander
(74) *Attorney, Agent, or Firm* — Reichel Stohry Dean LLP; Mark C. Reichel; Natalie J. Dean (57) ABSTRACT

Systems and devices and methods of making and using the same to prepare nut milk products. An exemplary system of the present disclosure includes a blending device capable of blending a quantity of nuts with a quantity of a liquid to break down the quantity of nuts into pieces to generate a blended product, a porous vessel defining an opening and configured to strain the blended product so that when the blended product is introduced into the opening, at least part of a solid fraction of the blended product remains within the porous vessel, and at least part of a liquid fraction of the blended product passes through the porous vessel which is collected as a filtered or strained product, and a non-porous
(Continued)

vessel configured to receive at least part of the porous vessel therein and further configured to receive the filtered or strained product.

14 Claims, 9 Drawing Sheets

(51) Int. Cl.
  *A23L 2/66* (2006.01)
  *A23L 25/00* (2016.01)
  *A23N 1/02* (2006.01)
  *A47J 44/00* (2006.01)

(58) Field of Classification Search
  CPC ........ A47J 43/046; A47J 27/004; A47J 27/04; A47J 43/07; A47J 43/27; A23V 2002/00; A23L 2/66; A23L 2/38; A23L 25/30; A23L 3/364; A23L 2/12; A23L 2/04; A23C 11/103; A23N 1/02; A23N 1/003
  USPC ......... 99/454, 472, 348, 334, 492, 509–513, 99/495
  See application file for complete search history.

(56) References Cited

U.S. PATENT DOCUMENTS

| | | | |
|---|---|---|---|
| 6,153,247 A | 11/2000 | Stoddard | |
| 9,290,734 B2 | 3/2016 | Kohn | |
| 2005/0242114 A1* | 11/2005 | Savage | B65D 75/5877 |
| | | | 222/92 |
| 2012/0021108 A1* | 1/2012 | Baumann | B65D 65/466 |
| | | | 426/433 |
| 2017/0252691 A1* | 9/2017 | Johnson | B01D 46/2411 |
| 2018/0014695 A1 | 1/2018 | Gross et al. | |
| 2018/0079991 A1 | 3/2018 | Green | |

FOREIGN PATENT DOCUMENTS

| | | | |
|---|---|---|---|
| KR | 200475141 Y1 | * | 11/2014 |
| KR | 20150003336 U | * | 9/2015 |

OTHER PUBLICATIONS

This ("Cooking in a Vacuum—Chapter 83":, Molecular Gastronomy:: Exploring the Science of Flavor, Columbia University Press, Jan. 4, 2006, p. 279-281). (Year: 2006).*
"What is the different between gravity and vacuum filtration?" https://www.environmental-expert.com/news/what-is-the-difference-between-gravity-and-vacuum-filtration-473712 (Year: 2015).*
Middleton, Bo, Milk Punch Filtration Using A Vacuum Filter, The Manhattan Cocktail Society, Jun. 27, 2014, http://manhattancocktailsociety.blogspot.com/2014/06/milk-punch-filtration-using-vacuum.html, retrieved Aug. 24, 2023 (Year: 2014).*
Stonybrook vacuum traps (Year: 2010).*
CN-101531265-A English translation (Year: 2009).*
KR-200475141-Y1 (Year: 2014).*
International Searching Authority, International Search Report, PCT/US2018/031648, Dated Jul. 9, 2018.
International Searching Authority, Written Opinion of the International Searching Authority, PCT/US2018/031648, Dated Jul. 9, 2018.

* cited by examiner

SYSTEMS AND DEVICES AND METHODS OF MAKING AND USING THE SAME TO PREPARE NUT MILK PRODUCTS

PRIORITY

The present application is related to, claims the priority benefit of, and is U.S. 35 U.S.C. 371 national stage patent application of, International Patent Application Serial No. PCT/US2018/031648, filed May 8, 2018, which is related to, and claims the priority benefit of, U.S. Provisional Patent Application Ser. No. 62/503,176, filed May 8, 2017, the contents of which are hereby incorporated by reference in their entirety into the present disclosure.

BACKGROUND

Non-traditional milk products, such as almond milk, cashew milk, or other nut milks, are now more prevalent in the marketplace than ever before. The process of making such a nut milk at home, however, is generally messy, time consuming, and results in an excess of waste.

In view of the same, systems and devices to prepare nut milk products, and liquid products from other solid food products, and methods of making and using the same, would be well received in the marketplace.

BRIEF SUMMARY

In an exemplary embodiment of a system of the present disclosure, the system comprises a blending device capable of blending a quantity of nuts with a quantity of a liquid to break down the quantity of nuts into pieces to generate a blended product; a porous vessel defining an opening and configured to strain the blended product so that when the blended product is introduced into the opening, at least part of a solid fraction of the blended product remains within the porous vessel, and at least part of a liquid fraction of the blended product passes through the porous vessel which is collected as a filtered or strained product; and a non-porous vessel configured to receive at least part of the porous vessel therein and further configured to receive the filtered or strained product; wherein the non-porous vessel is configured to be coupled to or in communication with a liquid receptacle; and wherein when a vacuum apparatus in communication with the non-porous vessel and a liquid receptacle adjacent to the non-porous vessel is operated, vacuum is created and causes the filtered or strained product to transfer from the non-porous vessel to the liquid receptacle.

In an exemplary embodiment of a system of the present disclosure, the porous vessel is selected from the group consisting of a mesh bag and cheese cloth.

In an exemplary embodiment of a system of the present disclosure, the system is configured so that when the vacuum is created, at least another part of the liquid fraction of the blended product passes through the porous vessel into the non-porous vessel and into the liquid receptacle.

In an exemplary embodiment of a system of the present disclosure, the system further comprises a tube extending between an aperture of the non-porous vessel and a tube aperture defined within the liquid receptacle.

In an exemplary embodiment of a system of the present disclosure, the system further comprises a tube extending between an aperture of the non-porous vessel and a tube aperture defined within a first lid or cap applied to the liquid receptacle.

In an exemplary embodiment of a system of the present disclosure, the system further comprises a substrate comprising a ribbed element, the substrate positioned within the non-porous vessel adjacent to the porous vessel and configured to prevent the non-porous vessel from completely collapsing about itself when the vacuum is created.

In an exemplary embodiment of a system of the present disclosure, the non-porous vessel has a ribbed feature configured to prevent the non-porous vessel from completely collapsing about itself when the vacuum is created.

In an exemplary embodiment of a system of the present disclosure, the system further comprises a first lid or cap having an aperture defined therethrough, the first lid or cap configured to be applied to the liquid receptacle and to receive at least part of a tube within the aperture.

In an exemplary embodiment of a system of the present disclosure, the system further comprises a second lid or cap not having an aperture defined therethrough, the second lid or cap configured to be applied to the liquid receptacle to seal the liquid receptacle.

In an exemplary embodiment of a system of the present disclosure, the system further comprises an adapter configured to connect a tube to the non-porous vessel.

In an exemplary embodiment of a system of the present disclosure the non-porous vessel is configured for coupling directly to the liquid receptacle at an opening of the liquid receptacle.

In an exemplary embodiment of a system of the present disclosure, the system further comprises a substrate comprising a ribbed element, the substrate positioned within the non-porous vessel.

In an exemplary embodiment of a system of the present disclosure, the system further comprises an adapter configured for positioning adjacent to the opening of the liquid receptacle.

In an exemplary embodiment of a system of the present disclosure, the system further comprises the liquid receptacle.

In an exemplary embodiment of a system of the present disclosure, the system further comprises the vacuum apparatus.

In an exemplary embodiment of a system of the present disclosure, the porous vessel fits completely within the non-porous vessel.

In an exemplary embodiment of a system of the present disclosure, the porous vessel has a ribbed feature configured to prevent the non-porous vessel from completely collapsing about itself when the vacuum is created.

In an exemplary embodiment of a system of the present disclosure, the system further comprises an adapter configured for positioning adjacent to the opening of the liquid receptacle.

In an exemplary embodiment of a system of the present disclosure, the adapter has a primary aperture defined therethrough.

In an exemplary embodiment of a system of the present disclosure, the primary aperture is sized and shaped for connection with a tube.

In an exemplary embodiment of a system of the present disclosure, the system further comprises a tube attached to adapter and configured to allow transfer of the filtered or strained product from the porous vessel, through the tube, and into the liquid container.

In an exemplary embodiment of a system of the present disclosure, the adapter has a plurality of secondary apertures defined therethrough.

In an exemplary embodiment of a system of the present disclosure, the plurality of secondary apertures have a smaller diameter or cross-sectional area than the primary aperture.

In an exemplary embodiment of a system of the present disclosure, the adapter comprises a plurality of sloped elements extending from a base substrate of the adapter.

In an exemplary embodiment of a system of the present disclosure, each sloped element of the plurality of sloped elements slopes inward and downward from a relative top toward the primary aperture.

In an exemplary embodiment of a system of the present disclosure, a groove is defined between each of the plurality of sloped elements.

In an exemplary embodiment of a system of the present disclosure, each groove is relatively narrower along an outer periphery/circumference defined by the plurality of sloped elements, and wherein each groove is relatively wider near a relative center of the adapter.

In an exemplary embodiment of a system of the present disclosure, the primary aperture is relatively larger on one side of the adapter and relatively smaller on another, opposite side of the adapter.

In an exemplary embodiment of a system of the present disclosure, the adapter comprises a cylinder having a cylinder wall extending from a base substrate of the adapter.

In an exemplary embodiment of a system of the present disclosure, the primary aperture extends from one side of the adapter and through the cylinder to another, opposite side of the adapter.

In an exemplary embodiment of a system of the present disclosure, a hollow portion is defined within the cylinder wall, the hollow portion having a larger diameter or cross-sectional area than the primary aperture.

In an exemplary embodiment of a method of the present disclosure, the method comprises operating the blending device of a system to blend the quantity of nuts to generate the blended product; and operating the vacuum device to cause the filtered or strained product to transfer from the non-porous vessel to the liquid receptacle.

In an exemplary embodiment of a method of the present disclosure, the method further comprises placing a lid or cap upon the liquid receptacle to seal the liquid receptacle.

In an exemplary embodiment of a system of the present disclosure, the system comprises a blending device capable of blending a quantity of nuts with a quantity of a liquid to break down the quantity of nuts into pieces to generate a blended product; a porous vessel defining an opening and configured to strain the blended product so that when the blended product is introduced into the opening, at least part of a solid fraction of the blended product remains within the porous vessel, and at least part of a liquid fraction of the blended product passes through the porous vessel which is collected as a filtered or strained product; a non-porous vessel configured to receive at least part of the porous vessel therein and further configured to receive the filtered or strained product; and a liquid receptacle in communication with the non-porous vessel; wherein when a vacuum apparatus in communication with the non-porous vessel and the liquid receptacle is operated, vacuum is created and causes the filtered or strained product to transfer from the non-porous vessel to the liquid receptacle.

In an exemplary embodiment of a system of the present disclosure, the system comprises a blending device capable of blending a quantity of a solid food product with a quantity of a liquid to break down the quantity of nuts into pieces to generate a blended product; a porous vessel defining an opening and configured to strain the blended product so that when the blended product is introduced into the opening, at least part of a solid fraction of the blended product remains within the porous vessel, and at least part of a liquid fraction of the blended product passes through the porous vessel which is collected as a filtered or strained product; a non-porous vessel configured to receive at least part of the porous vessel therein and further configured to receive the filtered or strained product; a liquid receptacle in communication with the non-porous vessel; and an adapter configured for positioning adjacent to the opening of the liquid receptacle; wherein when a vacuum apparatus in communication with the non-porous vessel and the liquid receptacle is operated, vacuum is created and causes the filtered or strained product to transfer from the non-porous vessel to the liquid receptacle.

In an exemplary embodiment of a method of the present disclosure, the method comprises operating a blending device to blend a quantity of nuts with a quantity of a liquid to break down the quantity of nuts into pieces to generate a blended product; introducing the blended product into a porous vessel defining an opening to strain the blended product so that at least part of a solid fraction of the blended product remains within the porous vessel and so that at least part of a liquid fraction of the blended product passes through the porous vessel which is collected as a filtered or strained product within a non-porous vessel, the non-porous vessel configured to receive at least part of the porous vessel therein along with the filtered or strained product; and operating a vacuum apparatus in communication with the non-porous vessel and a liquid receptacle adjacent to the non-porous vessel to create a vacuum, causing the filtered or strained product to transfer from the non-porous vessel to the liquid receptacle.

In an exemplary embodiment of a method of the present disclosure, the method further comprises placing a lid or cap upon the liquid receptacle to seal the liquid receptacle.

The present disclosure includes disclosure of systems, as described and/or shown herein. The present disclosure includes disclosure of devices, namely components of systems, as described and/or shown herein. The present disclosure includes disclosure of systems, as described and/or shown herein, configured for use to produce a filtered or strained nut milk product. The present disclosure includes disclosure of methods to product a filtered or strained nut milk product, as described herein.

BRIEF DESCRIPTION OF THE DRAWINGS

The disclosed embodiments and other features, advantages, and disclosures contained herein, and the matter of attaining them, will become apparent and the present disclosure will be better understood by reference to the following description of various exemplary embodiments of the present disclosure taken in conjunction with the accompanying drawings, wherein.

An overview of the features, functions and/or configurations of the components depicted in the various figures will now be presented. It should be appreciated that not all of the features of the components of the figures are necessarily described. Some of these non-discussed features, such as various couplers, etc., as well as discussed features are inherent from the figures themselves. Other non-discussed features may be inherent in component geometry and/or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
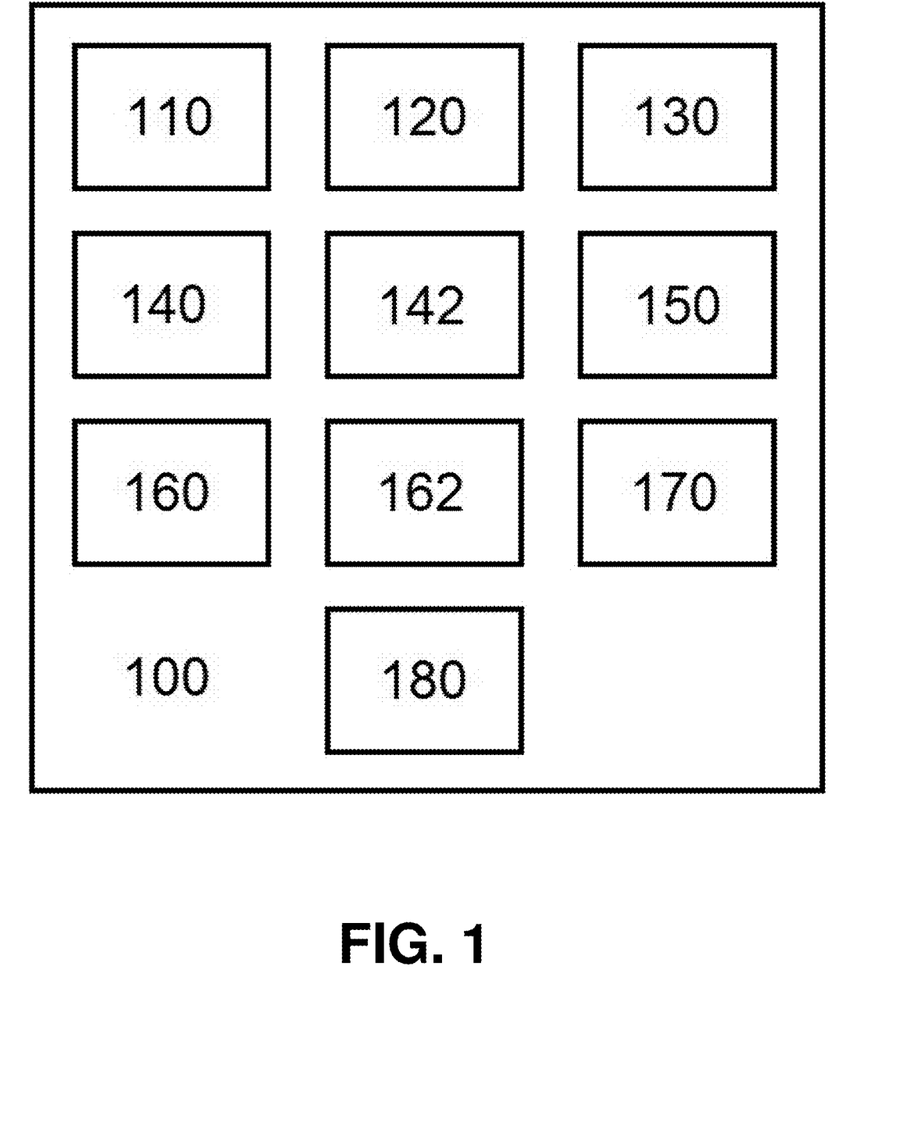
FIG. 1 shows a block component diagram of one or more components of an exemplary system, according to at least one embodiment of the present disclosure.

An exemplary system for producing a nut milk product or another liquid product of the present disclosure is shown in FIG. 1 in block component form. As shown therein, an exemplary system 100 of the present disclosure comprises one or more of the following items: a blending device 110, a porous vessel 120, a non-porous vessel 130, a liquid receptacle 140, and a vacuum apparatus 150. Other items, such as shown in FIG. 1, may comprise elements/components of systems 100 as well, as described in further detail herein. An exemplary blending device 110 of the present disclosure may comprise a traditional blender, such as a traditional upright blender with a glass or plastic receptacle, an immersion blender used with some sort of cup, bowl, or other reservoir, etc., wherein said blending device 110 is capable of blending a quantity of nuts 200 (or another solid food product, such as one or more vegetables, one or more fruits, etc.) with a quantity of a liquid 202 so to liquefy, emulsify, chop, grind, shred, grate, etc., or otherwise break down the quantity of nuts 200 or other food product into small pieces, such as all the way down to a fine nut particulate, within the quantity of liquid 202 to generate a blended product 204.

An exemplary porous vessel 120 of the present disclosure may comprise a mesh bag, cheese cloth, etc., configured so that the blended product 204 could be poured into an opening 122 of said porous vessel 120, and whereby the porous vessel 120 is configured to strain, filter, etc., the blended product 204 so that at least part of a liquid fraction of the blended product 205 passes through porous vessel 120, and so that at least part of a solid fraction of the blended product 207 (relatively large pieces of blended nut) would remain within porous vessel 120. As nuts are relatively hard, the process of using a blending device 110 to blend the quantity of nuts 200 with the quantity of a liquid 202 to generate the blended product 204 results in the blended product 204 that is somewhat gritty due to pieces of nut therein. Filtering or straining the blended product 204 through the porous vessel removes at least some of the nut pieces from the blended product 204 so that the filtered or strained product 206 is less gritty than the blended product 204 itself.

Figure 2:
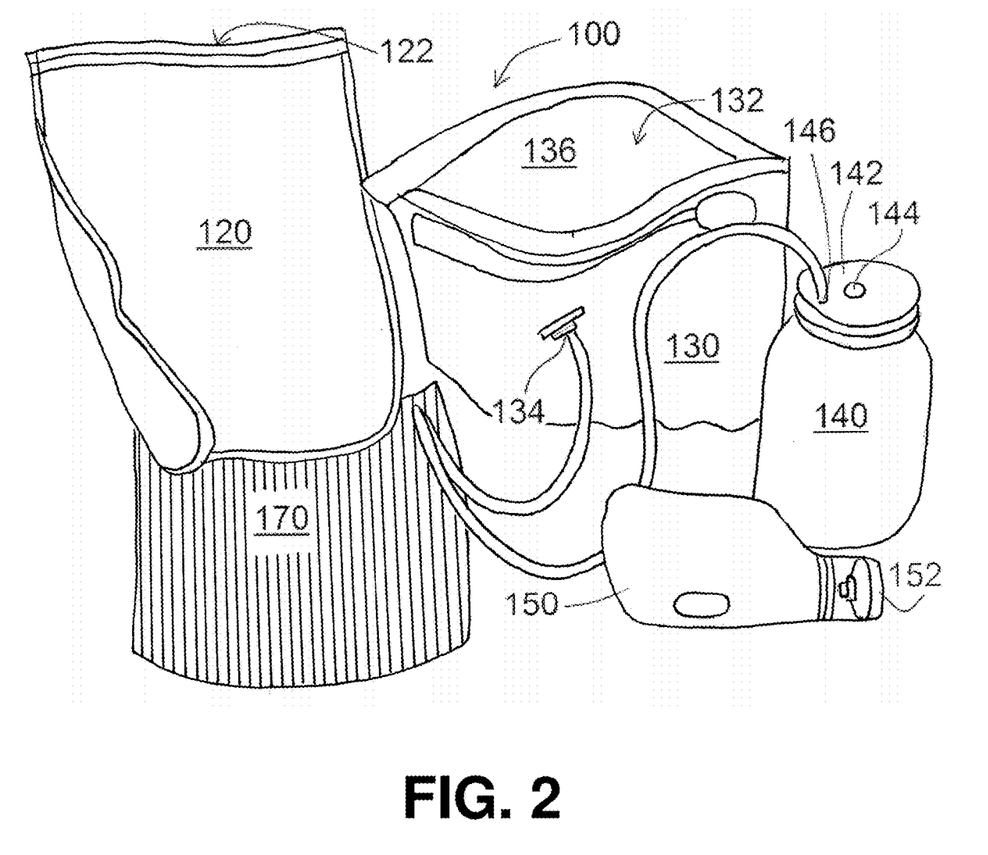
FIG. 2 shows an image of elements of an exemplary system that is not fully connected, according to at least one embodiment of the present disclosure.
Figure 5:
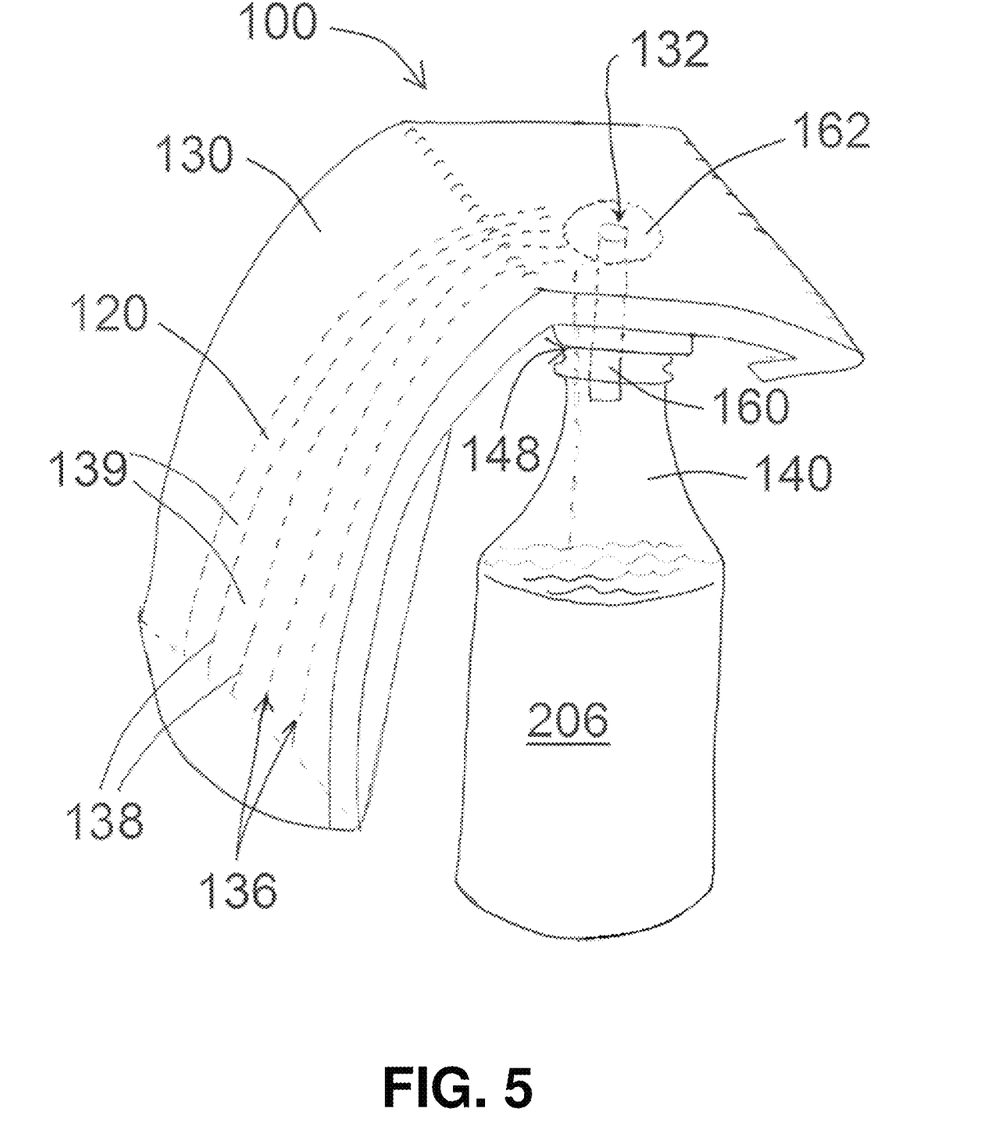
FIG. 5 shows a sketch of components of an exemplary system, according to at least one embodiment of the present disclosure.
Figure 12:
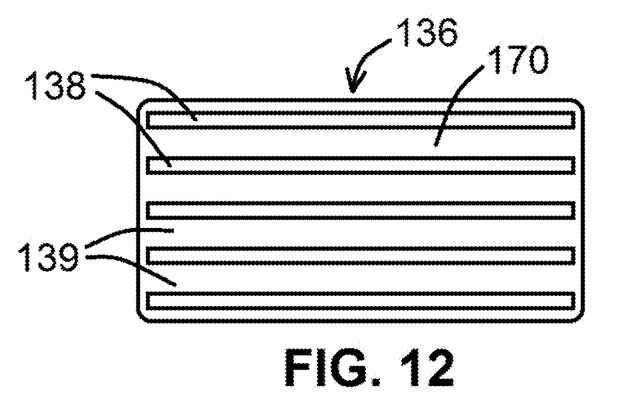
FIG. 12 shows a substrate (a ribbed element) having a series of elongated ribs and a series of elongated grooves therebetween, according to at least one embodiment of the present disclosure.

An exemplary non-porous vessel 130 of the present disclosure may comprise a plastic bag, plastic vessel, glass vessel, etc., configured to receive at least part of porous vessel 120 therein. FIG. 2 shows components of an exemplary system 100 of the present disclosure, including a porous vessel 120 (configured as a mesh bag having an opening 122), a non-porous vessel 130 (configured as a plastic bag), a liquid receptacle 140 (configured as a glass jar, having a lid or cap 142 coupled thereto), and a vacuum apparatus 150. When such a system embodiment is in use, porous vessel 120 can be placed at least partially within non-porous vessel 130, such as by placing porous vessel 120 inside non-porous vessel 130 (by way of opening 132 of non-porous vessel 130, for example), pouring blended product 204 into opening 122 of porous vessel 120, closing opening 122 (such as by, for example, cinching the top of porous vessel 120 or otherwise fully closing or substantially closing opening 122), and closing non-porous vessel 130 (such as by, for example, press-sealing the top of non-non-porous vessel 130, using or otherwise closing non-porous vessel 130). After non-porous vessel 130 is closed with porous vessel 120 therein, vacuum apparatus 150 can be operated relative to liquid receptacle 140, such as by positioning a vacuum tip 152 of vacuum apparatus 150 relative to a vacuum aperture 144 defined within lid or cap 142 or otherwise defined within liquid receptacle 140, and operating vacuum apparatus 150 to create a vacuum within liquid receptacle. Said vacuum causes blended product 204 (that has not already passed through porous vessel 120 into non-porous vessel 130) to pass through porous vessel 120 (referred to herein as at least another part of the liquid fraction of the blended product 209) into non-porous vessel 130, through an aperture 134 defined within non-porous vessel 130, and ultimately into liquid receptacle 140, such as by, for example, a tube 160 extending between aperture 134 of non-porous vessel 130 and tube aperture 146 defined within lid or cap 142 or otherwise defined within liquid receptacle 140. Such a process causes filtered or strained product 206 to pass from non-porous vessel 130 into liquid receptacle 140, for storage or consumption, as may be desired. A ribbed element 170, such as a section of corrugated/ribbed plastic shown in FIG. 2, or otherwise an element that is not completely flat, can be placed within non-porous vessel 130 adjacent to porous vessel 120, so that when vacuum is applied using vacuum apparatus 150, the suction created within non-porous vessel 130 would not completely collapse non-porous vessel 130 about itself, allowing filtered or strained product 206 to pass through aperture 134 of non-porous vessel 130, through tube 160, and into liquid receptacle 140. Non-porous vessel 130 may also have a ribbed feature 136 (defined by a series of elongated ribs 138, defining a series of elongated grooves 139 therebetween), such as shown in FIG. 5, that prevents non-porous vessel from completely collapsing about itself while under vacuum. Porous vessel 130 may have a ribbed feature 136, or ribbed feature 136 may have its own substrate (such as ribbed element 170 shown in FIGS. 6 and 12), whereby substrate 135 can itself form part of an exemplary system 100 of the present disclosure.

Exemplary systems 100 of the present disclosure allow for more efficient nut milk product generation, namely the filtered or strained product 206 that is collected within liquid receptacle 140, than with traditional methods, which may include, for example, physically hand-squeezing a porous vessel 120 having a blended product 204 therein and collecting the same in a bowl or other receptacle. It is also much less messy, much easier to use, and would cause far less frustration to the maker of such a nut milk product. Operation of elements of such systems 100 would cause more nut milk (filtered or strained product 206) to be extracted, without mess, and directly collected within a liquid receptacle.

Exemplary non-porous vessels 130 of the present disclosure may comprise silicone bags, other plastic bags, jars, etc., as referenced herein, as may be desired. An adapter 162, such as shown in FIG. 2, could permanently or removably connect tube 160 to non-porous vessel 130, such as at aperture 134.

Non-porous vessels 130 could be closed as referenced herein or otherwise closed by, for example, folding down portions of non-porous vessel 130 and securing the same with a clip 180.

Systems 100 may comprise lids or caps 142 that do not have apertures 144, 146 defined therein, so that after system 100 is used to extract a quantity of nut milk (filtered or strained product 206) within liquid receptacle 140, the first lid or cap 142, having apertures 144, 146 defined therein, can be exchange for a second lid or cap 142 that does not have apertures 144, 146 therein, such as for storage purposes.

Porous vessel 120, non-porous vessel 130, liquid receptacle 140, and/or tubing 160 may be disposable (such as single- or multiple-time but not permanent use), or intended for permanent use, such as whereby porous vessel 120, non-porous vessel 130, liquid receptacle 140, and/or tubing 160 can be cleaned, stored, and used in the future after initial use.

Figure 3:
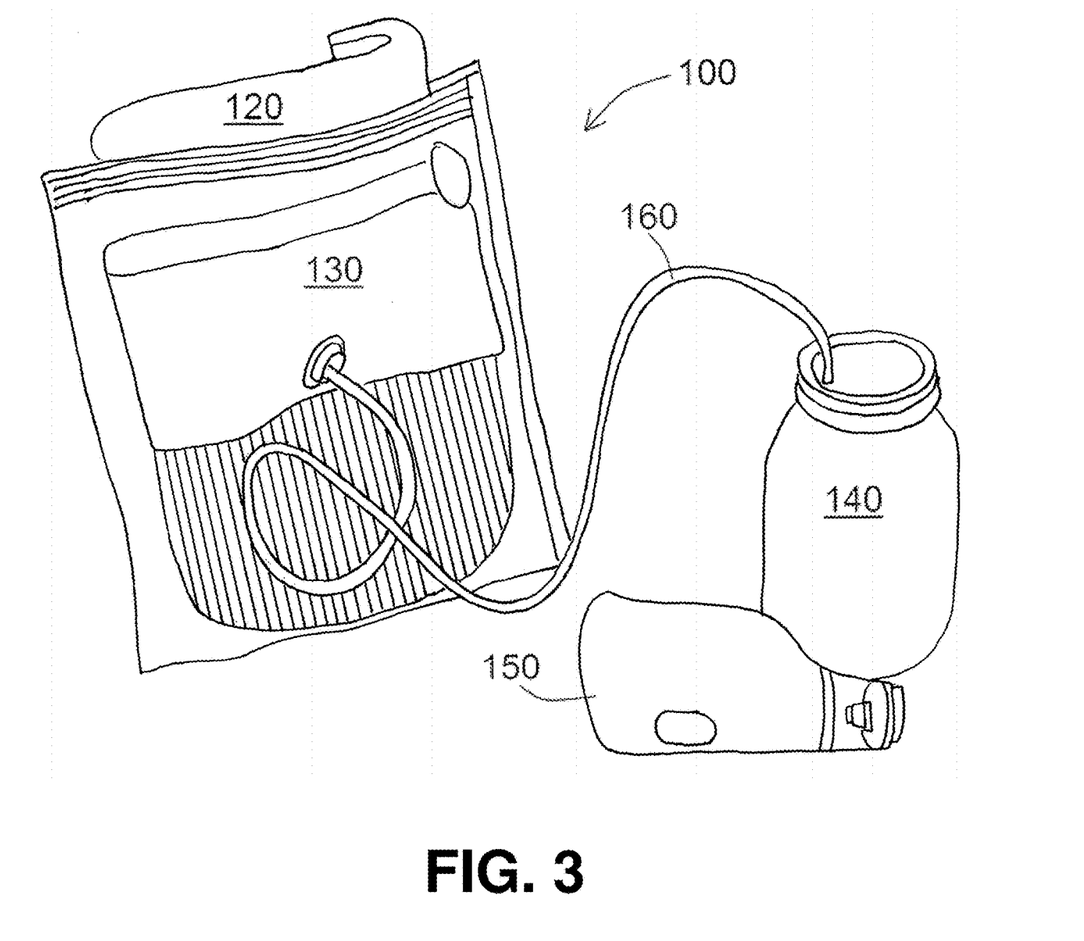
FIG. 3 shows an image of elements of an exemplary system with a porous vessel positioned at least partially within a non-porous vessel, according to at least one embodiment of the present disclosure.

FIG. 3 shows an image of elements of an exemplary system 100 with a porous vessel 120 positioned at least partially within a non-porous vessel 130.

Figure 4:
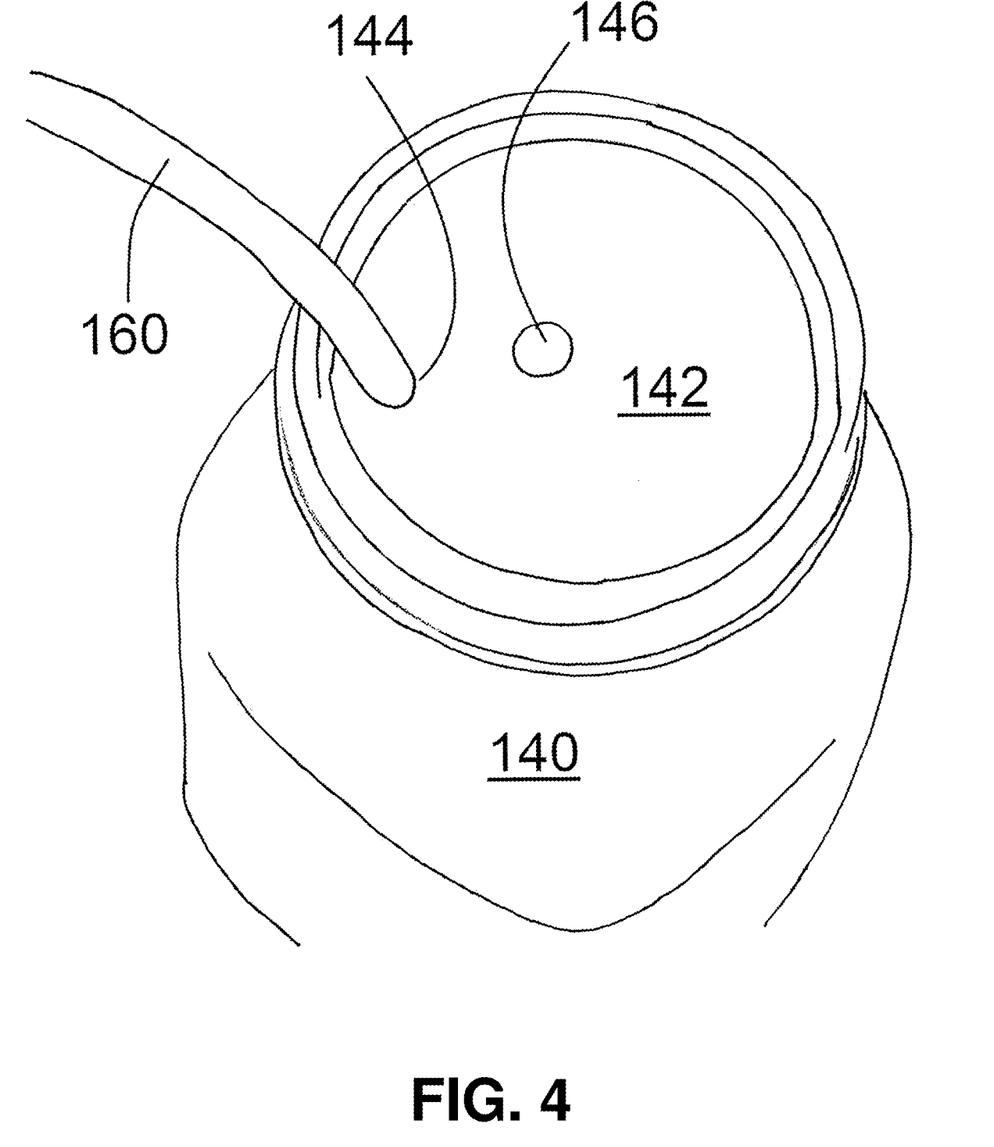
FIG. 4 shows a perspective view of a liquid receptacle having a lid or cap coupled thereto, according to at least one embodiment of the present disclosure.

FIG. 4 shows a perspective view of a liquid receptacle 140 having a lid or cap 142 coupled thereto. As shown therein, vacuum aperture 144 and tube aperture 146 are defined within lid or cap 142, and tube 160 is in communication with tube aperture 146.

FIG. 5 shows an exemplary system 100 of the present disclosure, whereby non-porous vessel 130 is configured to couple directly to liquid receptacle 140. As shown therein, non-porous vessel 130 has porous vessel 120 inside, with non-porous vessel 130 having a ribbed feature 136 therein, defined by a series of elongated ribs 138, defining a series of elongated grooves 139 therebetween, with non-porous vessel 130 coupled to an opening 148 of liquid receptacle 140. Filtered or strained product 206 could then move, under vacuum, from the non-porous vessel 130 along and within the elongated grooves 139 of the ribbed feature 136, to adapter 162. An opening 132 of non-porous vessel 130, such as an or at adapter 162, would be adjacent to opening 148 of liquid receptacle 140. An optional tube 160 (such as a short section of tubing shown in FIG. 5) could be attached to adapter 162 so to facilitate transfer of filtered or strained product 206 from porous vessel 120 into liquid receptacle 140, noting that tube 160 would not be required. A vacuum apparatus 150 could also be used, such as attached to non-porous bag 130 or other elements of system 100, so to facilitate transfer of filtered or strained product 206 from porous vessel 120 into liquid receptacle 140. Alternatively, non-porous bag 130 could be physically squeezed, rolled, etc., so to force filtered or strained product 206 from porous vessel 120 into liquid receptacle 140, as may be desired.

Figure 6:
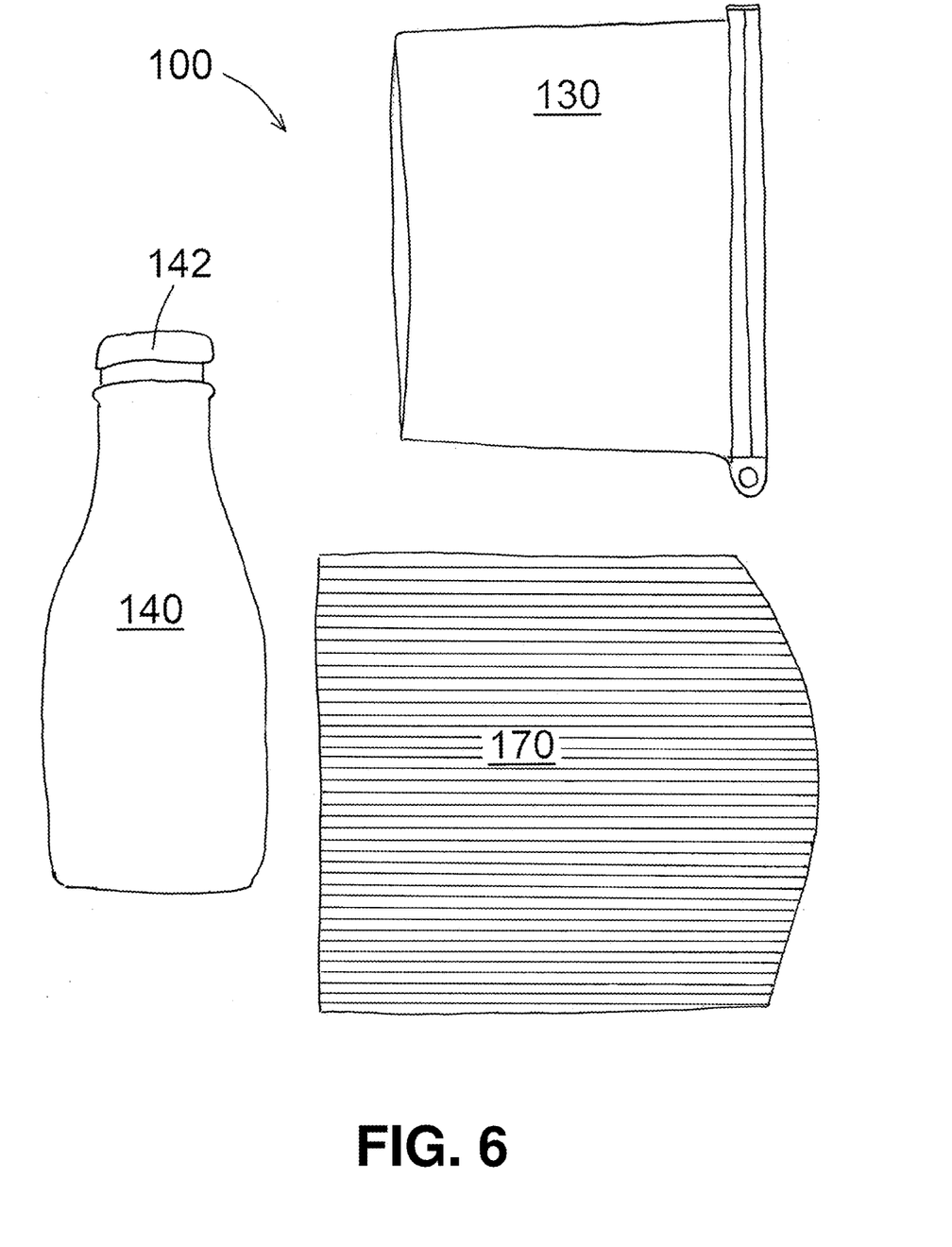
FIG. 6 shows an image of elements of an exemplary system, according to at least one embodiment of the present disclosure.

FIG. 6 shows an image of elements of an exemplary system 100, according to at least one embodiment of the present disclosure. As shown therein, non-porous vessel 130 may be configured as a silicone bag, liquid receptacle 140 may be configured as a milk bottle, and ribbed element 170 may have a series of elongated protrusions (a series of elongated ribs 138), defining a series of elongated grooves 139 therebetween, and be configured to fit within non-porous vessel.

An exemplary recipe of the present disclosure may comprise one part nuts 200 to three parts liquid product 202, such as one cup of nuts 200 and three cups of water (liquid product 202) or an equivalent or different ratio thereof, blending the same using blending device 110 to create blended product 204, and filtering/straining the blended product 204 as referenced herein to produce a quantity of filtered or strained product 206 within liquid receptacle 140.

An exemplary adapter 162 embodiment of the present disclosure is shown in FIGS. 7-11. As shown therein, an exemplary adapter 162 of the present disclosure has an aperture 134 (also referred to as the primary aperture 134) defined therethrough. As noted above, filtered or strained product 206 could then move, under vacuum, from the non-porous vessel 130 along and within the elongated grooves 139 of the ribbed feature 136, to adapter 162.

Exemplary adapters 162 of the present disclosure, such as shown in FIGS. 7-11, can further have a plurality of secondary apertures 300 defined therethough, and in at least some embodiments, secondary apertures 300 have a smaller diameter or cross-sectional area than primary aperture 134. Under vacuum, filtered or strained product 206 can move to the adapter 162 and through one or more of the plurality of secondary apertures 300 and into the liquid receptacle 140. Such a design allows the filtered or strained product 206 to enter the liquid receptacle 140 under vacuum without pulling the filtered or strained product 206 into the vacuum apparatus 150.

Figure 10:
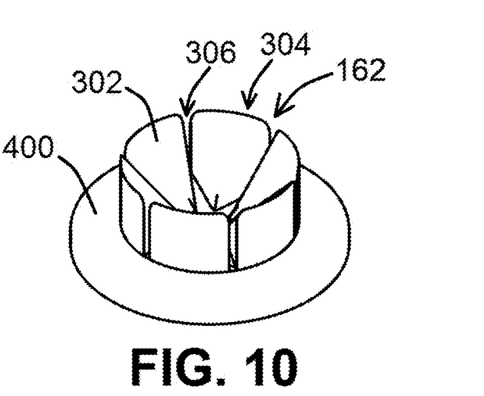
FIG. 10 shows an opposite side perspective view of the adapter of FIG. 9.
Figure 11:
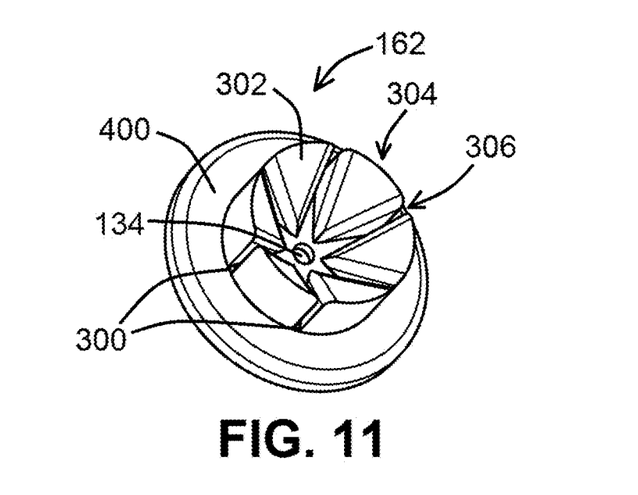
FIG. 11 shows a perspective view of an adapter, according to at least one embodiment of the present disclosure.

As shown in FIGS. 10 and 11, for example, a plurality of sloped elements 302 (also referred to as tooth-like projections) can be present upon an adapter 162 of the present disclosure, such as having a relative top 304 closer to a relative outer portion of the adapter 162, sloping downward and inward toward primary aperture 134. A tube 160, for example, connected to a vacuum apparatus 150 can also be connected to adapter 162 at primary aperture. As noted above, and under vacuum, filtered or strained product 206 can move to the adapter 162 and through one or more of the plurality of secondary apertures 300 and into the liquid receptacle 140.

Figure 7:
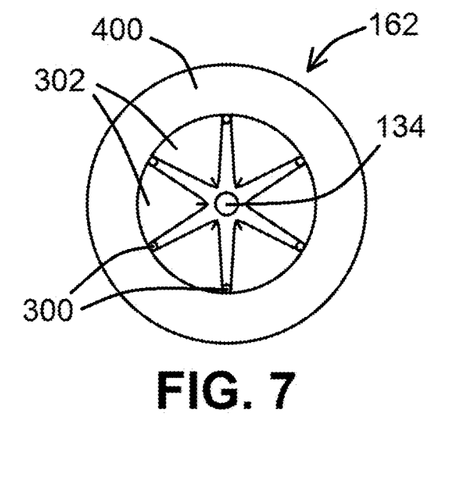
FIG. 7 shows a front or back view of an adapter, according to at least one embodiment of the present disclosure.

In at least one example, six sloped elements 302 may be present each separate from the other by way of a groove 306. More or fewer sloped elements 302 may be present as well. As shown in FIG. 7, for example, grooves 306 can be relatively narrower along an outer periphery/circumference defined by the plurality of sloped elements 302, and grooves 306 can be relatively wider near a relative center of adapter 302, adjacent to primary aperture 134. Such a configuration of said grooves 306 relative to (or between) sloped elements 302 cause capillary action to hold the liquid (such as filtered or strained product 206) at the relative periphery/circumference (defined by the plurality of sloped elements 302) rather than allowing it to migrate toward primary aperture 134, where vacuum is applied. The general slope of sloped elements 302, such as having a relative top 304 closer to a relative outer portion of the adapter 162, sloping downward and inward toward primary aperture 134 as referenced above, also helps keep the filtered or strained product 206 from going toward the center of adapter 162 (at or near primary aperture 134). Such an embodiment of a system 100, using an adapter 162, may be preferred over a system 100 with no adapter, such as having a tube 160 positioned within a tube aperture 146 defined within a lid or cap 142 (such as shown in FIG. 2), as depending on overall system configuration, such a system 100 embodiment may better keep filtered or strained product 206 away from tube 160 when vacuum is applied. Filtered or strained product 206 can flow from a relative top of adapter 162, through the plurality of secondary apertures 300, to a relative bottom of adapter 162, and into the liquid receptacle 140.

Figure 9:
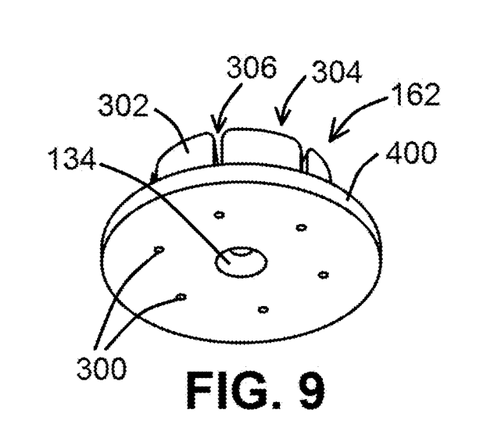
FIG. 9 shows a side perspective view of an adapter, according to at least one embodiment of the present disclosure.

Each of the plurality of secondary apertures 300 can be defined within aperture 162 between the plurality of sloped elements 302, such as shown in FIGS. 7 and 9.

As shown in FIG. 9, primary aperture 134 may be relatively larger on one side of adapter 162 and relatively smaller on another, opposite side of adapter 162 (such as also shown in FIGS. 7 and 11 as compared to FIG. 9), and may also be curved or sloped inward toward a relative center of primary aperture 134.

Figure 8:
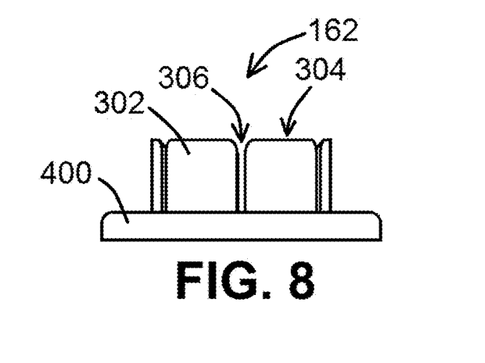
FIG. 8 shows a side view of an adapter, according to at least one embodiment of the present disclosure.

As shown in FIG. 8, an exemplary adapter may comprise a base substrate 400, and a plurality of sloped elements 302 extending outward from a surface of base substrate 400. The plurality of sloped elements 302 (also referred to as tooth-like projections) can be present upon an adapter 162 of the present disclosure, such as having a relative top 304 closer to a relative outer portion/periphery of the adapter 162, sloping downward and inward toward primary aperture 134, defined within base substrate 400 of adapter 162. The plurality of secondary apertures 300 can therefore be defined within base substrate 400 of adapter 162.

Figure 13:
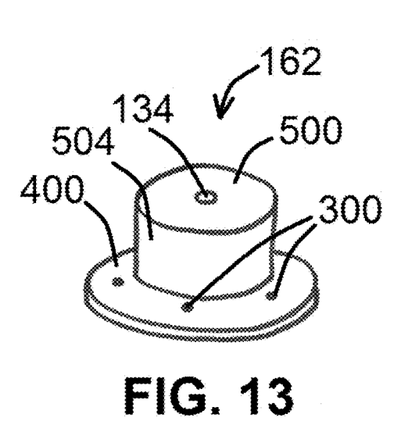
FIG. 13 shows a perspective view of an adapter, according to at least one embodiment of the present disclosure.
Figure 14:
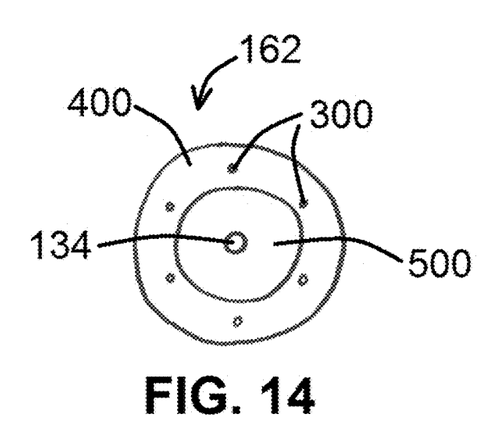
FIG. 14 shows a front or back view of the adapter of FIG. 13.
Figure 15:
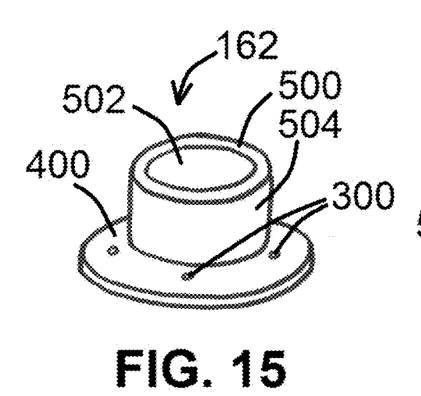
FIG. 15 shows a perspective view of an adapter, according to at least one embodiment of the present disclosure.
Figure 16:
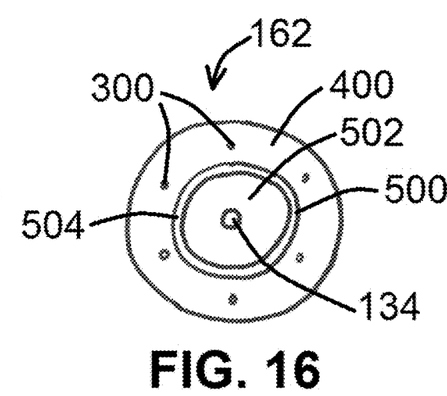
FIG. 16 shows a front or back view of the adapter of FIG. 15.
Figure 17:
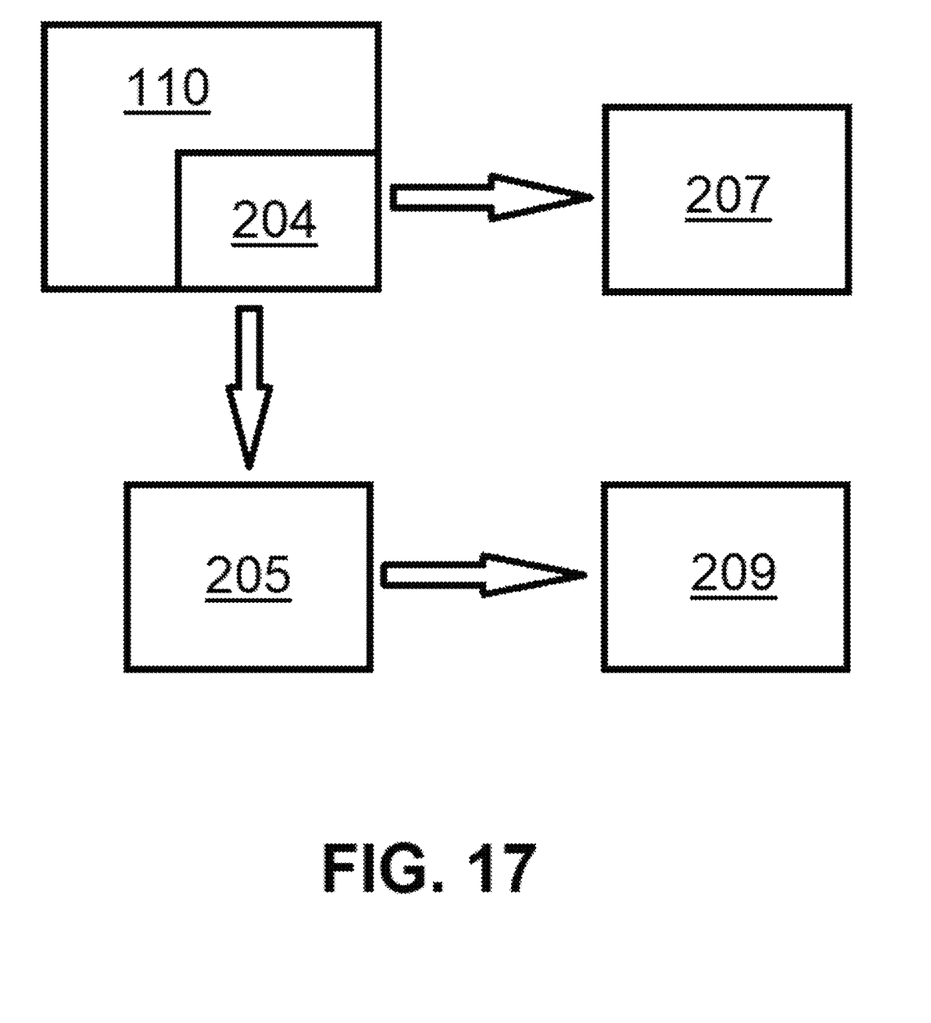
FIG. 17 shows a block diagram of use of a system to separate a solid fraction of a blended product from a liquid fraction of a blended product.

FIGS. 13-16 show another exemplary adapter 162 of the present disclosure. As shown therein, adapter 162 comprises a base substrate 400 and a cylinder 500 extending outward from a surface of base substrate 400. Adapter 162, as shown in FIGS. 13-16, can have many other features/elements of other adapter 162 embodiments of the present disclosure, such as, for example, a plurality of secondary apertures 300, a primary aperture 134 defined therethrough (such as defined within base substrate 400 and cylinder 500, as shown in FIG. 14, and such as defined within base substrate 400 and visible within a hollow portion 502 of cylinder 500, as shown in FIG. 16), etc. Cylinder 500 can have a relatively thick cylinder wall 504, such as shown in FIGS. 13 and 14, or can have a relatively thin cylinder wall 504, such as shown in FIGS. 15 and 16. Hollow portion 502, in at least on example, is defined within the cylinder wall 504 and has a larger diameter or cross-sectional area than diameter or cross-sectional of primary aperture 134.

While various embodiments of systems and devices and methods of making and using the same to prepare nut milk products have been described in considerable detail herein, the embodiments are merely offered as non-limiting examples of the disclosure described herein. It will therefore be understood that various changes and modifications may be made, and equivalents may be substituted for elements thereof, without departing from the scope of the present disclosure. The present disclosure is not intended to be exhaustive or limiting with respect to the content thereof.

Further, in describing representative embodiments, the present disclosure may have presented a method and/or a process as a particular sequence of steps. However, to the extent that the method or process does not rely on the particular order of steps set forth therein, the method or process should not be limited to the particular sequence of steps described, as other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

The invention claimed is:

1. A system, comprising:
    a blending device capable of blending a quantity of nuts with a quantity of a liquid to break down the quantity of nuts into pieces to generate a blended product;
    a porous vessel defining an opening and configured to strain the blended product when the blended product is introduced into the opening, at least part of a solid fraction of the blended product remains within the porous vessel, and at least part of a liquid fraction of the blended product passes through the porous vessel which is collected as a filtered or strained product;
    a vessel capable of containing liquid and configured to receive at least part of the porous vessel therein and further configured to receive the filtered or strained product; and
    an adapter configured for positioning adjacent to the vessel capable of containing liquid and having a primary aperture defined therethrough, the adapter comprising a base element having a plurality of secondary apertures separate and distinct from the primary aperture that are each smaller than the primary aperture defined therethrough and a generally cylindrical element extending from the base element;
    wherein the vessel capable of containing liquid is configured to be coupled to or in communication with a liquid receptacle; and
    wherein when a vacuum apparatus in communication with the vessel capable of containing liquid and the liquid receptacle adjacent to the vessel capable of containing liquid is operated, the system is configured such that vacuum is created and causes the filtered or strained product to transfer from the vessel capable of containing liquid to the liquid receptacle and to be retained within the liquid receptacle.

2. The system of claim 1, wherein the porous vessel is selected from the group consisting of a mesh bag and cheese cloth.

3. The system of claim 1, further comprising:
a tube extending between an aperture of the vessel capable of containing liquid and a tube aperture defined within the liquid receptacle.

4. The system of claim 1, further comprising:
a tube extending between an aperture of the vessel capable of containing liquid and a tube aperture defined within a first lid or cap applied to the liquid receptacle.

5. The system of claim 1, further comprising:
a substrate comprising a ribbed element, the substrate positioned within the vessel capable of containing liquid adjacent to the porous vessel and configured to prevent the vessel capable of containing liquid from completely collapsing when the vacuum is created.

6. The system of claim 1, further comprising:
a first lid or cap having an aperture defined therethrough, the first lid or cap configured to be applied to the liquid receptacle and to receive at least part of a tube within the aperture.

7. The system of claim 1, further comprising:
a substrate comprising a ribbed element, the substrate positioned within the vessel capable of containing liquid.

8. The system of claim 1, further comprising:
the liquid receptacle.

9. The system of claim 1, further comprising:
the vacuum apparatus.

10. The system of claim 1, further comprising:
a tube attached to adapter and configured to allow transfer of the filtered or strained product from the porous vessel, through the tube, and into the liquid receptacle.

11. The system of claim 1, wherein the primary aperture is larger on one side of the adapter and smaller on an opposite side of the adapter.

12. The system of claim 1, wherein the generally cylindrical element of the adapter comprises a fully cylindrical wall, and wherein the primary aperture is located within the fully cylindrical wall.

13. The system of claim 1, wherein the generally cylindrical element of the adapter comprises a plurality of sloped elements having grooves defined therebetween, the plurality of sloped elements having a relative top closer to a relative outer portion of the adapter, sloping downward and inward toward the primary aperture.

14. A system, comprising:
a blending device capable of blending a quantity of nuts with a quantity of a liquid to break down the quantity of nuts into pieces to generate a blended product;

a porous vessel defining an opening and configured to strain the blended product when the blended product is introduced into the opening, at least part of a solid fraction of the blended product remains within the porous vessel, and at least part of a liquid fraction of the blended product passes through the porous vessel which is collected as a filtered or strained product;

a vessel capable of containing liquid configured to receive at least part of the porous vessel therein and further configured to receive the filtered or strained product;

a liquid receptacle in communication with the vessel capable of containing liquid; and an adapter configured for positioning adjacent to the vessel capable of containing liquid and having a primary aperture defined therethrough, the adapter comprising a base element having a plurality of secondary apertures separate and distinct from the primary aperture that are each smaller than the primary aperture defined therethrough and a generally cylindrical element extending from the base element, the plurality of secondary apertures having a smaller diameter than a diameter of the primary aperture;

wherein when a vacuum apparatus in communication with the vessel capable of containing liquid and the liquid receptacle is operated, vacuum is created and causes the filtered or strained product to transfer from the vessel capable of containing liquid to the liquid receptacle and to be retained within the liquid receptacle.

\* \* \* \* \*